United States Patent
Nguyen et al.

(10) Patent No.: US 11,875,663 B2
(45) Date of Patent: Jan. 16, 2024

(54) ON-PREMISES COMMUNICATION BRIDGES FOR PREMISES SECURITY SYSTEMS

(71) Applicant: The ADT Security Corporation, Boca Raton, FL (US)

(72) Inventors: Tai Nguyen, Glenside, PA (US); Neil Brown, Wayne, PA (US)

(73) Assignee: The ADT Security Corporation, Boca Raton, FL (US)

( * ) Notice: Subject to any disclaimer, the term of this patent is extended or adjusted under 35 U.S.C. 154(b) by 0 days.

(21) Appl. No.: 18/064,082

(22) Filed: Dec. 9, 2022

(65) Prior Publication Data

US 2023/0186753 A1    Jun. 15, 2023

Related U.S. Application Data

(60) Provisional application No. 63/288,274, filed on Dec. 10, 2021.

(51) Int. Cl.
*G08B 25/00* (2006.01)
*H04B 17/318* (2015.01)
(Continued)

(52) U.S. Cl.
CPC ........... *G08B 25/001* (2013.01); *G08B 25/10* (2013.01); *H04B 17/318* (2015.01); *H04B 17/336* (2015.01)

(58) Field of Classification Search
CPC .... G08B 25/001; G08B 25/10; H04B 17/318; H04B 17/336
See application file for complete search history.

(56) References Cited

U.S. PATENT DOCUMENTS

| 5,625,338 A * | 4/1997 | Pildner | G08B 25/008 340/539.3 |
| 2004/0160309 A1* | 8/2004 | Stilp | G08B 25/10 340/10.2 |

(Continued)

FOREIGN PATENT DOCUMENTS

WO    2008042215 A1    4/2008

OTHER PUBLICATIONS

International Search Report and Written Opinion dated Mar. 20, 2023 for International Application No. PCT/US2022/052415 filed Dec. 9, 2022, consisting of 14-pages.

*Primary Examiner* — Ojiako K Nwugo
(74) *Attorney, Agent, or Firm* — Christopher & Weisberg, P.A.

(57) ABSTRACT

A method implemented by an on-site secondary control device in communication with an on-site primary control device for a premises security system is provided. The on-site primary control device is configured to trigger an alarm event signal associated with the premises security system, and the on-site secondary control device is physically separated from the on-site primary control device. An alarm event signal is received at the on-site secondary control device from the on-site primary control device indicating that a premises device has been triggered. The alarm event signal is temporarily stored. In response to determining that a criterion associated with the premises system is met, the alarm event signal is transmitted by the on-site secondary control device to the remote monitoring center.

11 Claims, 10 Drawing Sheets

(51) Int. Cl.
*H04B 17/336* (2015.01)
*G08B 25/10* (2006.01)

(56) References Cited

U.S. PATENT DOCUMENTS

| | | | | |
|---|---|---|---|---|
| 2008/0079561 A1* | 4/2008 | Trundle | ............... | G08B 29/185 340/506 |
| 2014/0372811 A1* | 12/2014 | Cohn | .................... | G08B 29/02 714/49 |
| 2015/0279187 A1* | 10/2015 | Kranz | ................ | G08B 21/0415 340/539.12 |
| 2015/0339912 A1* | 11/2015 | Farrand | ................ | G08B 25/006 340/501 |

* cited by examiner

ON-PREMISES COMMUNICATION BRIDGES FOR PREMISES SECURITY SYSTEMS

CROSS-REFERENCE TO RELATED PATENT APPLICATION

This application is related to and claims priority to U.S. Provisional Patent Application Ser. No. 63/288,274, filed Dec. 10, 2021, entitled ON-PREMISES COMMUNICATION BRIDGE FOR PREMISES SECURITY SYSTEM, the entirety of which is incorporated herein by reference.

TECHNICAL FIELD

The present disclosure relates to methods and premises security systems using on-site secondary controllers for performing backup and/or redundancy related functionality during a premises security event.

INTRODUCTION

Existing premises security systems monitor a premises for predefined events that are typically associated with one or more specialized sensors. For example, a premises security system may trigger an intrusion alarm when a door contact sensor is triggered. In accordance with American National Standards Institute (ANSI)/Security Industry Association (SIA) Control Panel (CP) compliance, e.g., CP-01 compliance, these existing premises security systems support an entry delay that is customizable within a given range of time. In some exiting systems, the entry delay may be customizable with the range of value from 15 to 60 seconds. The user must disarm the premises security system within the entry delay window, or the premises security system will send an alarm to the security monitoring center. However, while in the entry delay window, the premises security system does not report the alarm to the security monitoring center. Thus, there is a risk that an intruder can destroy the alarm controller and prevent the alarm from being reported to the security monitoring center during the entry delay window, which is known as "crash and smash."

BRIEF DESCRIPTION OF THE DRAWINGS

A more complete understanding of embodiments described herein, and the attendant advantages and features thereof, will be more readily understood by reference to the following detailed description when considered in conjunction with the accompanying drawings wherein.

DETAILED DESCRIPTION

Figure 1:
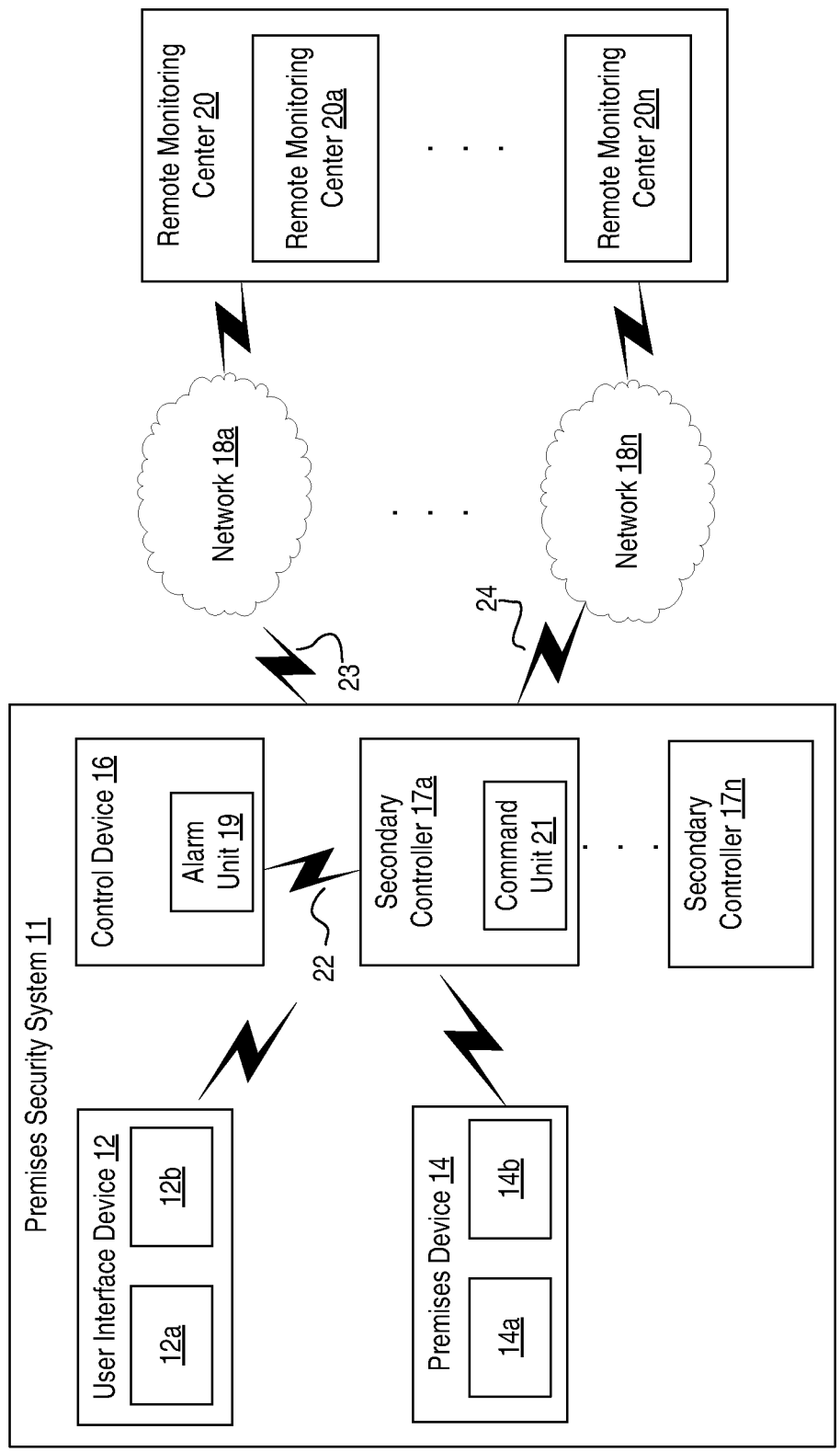
FIG. 1 is a diagram of an example system comprising a premises security system according to principles disclosed herein.

Some embodiments advantageously provide a method and premises security systems using on-site secondary controllers for performing backup and/or redundancy related functionality during a premises security event.

That is, some exiting systems may provide pre-registering of the alarm to the cloud service (i.e., off-site of the premises). However, in the event of communication loss, the main controller (e.g., an on-site main/primary control device) might not be able to register the alarm to the cloud service on time. One or more embodiments described herein provide for registering the alarm locally to a component within range of the main controller and thus reducing the chance for disruption. One advantage of this solution is the obscurity of the alarm reporting component. Another advantage is being able to leverage the user's mobile cellular device as a secondary alarm controller (e.g., an on-site secondary control device). The secondary controller(s) can be hidden in the premises in non-accessible location(s) by the attacker(s). The secondary controller(s) may be within local communication of the main controller. This arrangement reduces risk of up-stream disruption.

One or more embodiments descried herein solves one or more issues with existing systems by providing an in-home secondary controller that is physically separated from the main controller, where the system can pre-register the alarm at the beginning of the entry delay window. In the event the main controller is destroyed, the secondary controller can report the alarm. The secondary controller may be a hidden component with cellular communication to combat broadband loss. The secondary controller should have sufficient backup battery capability.

In one or more embodiments, in the home/premises, a base/control unit acts as the main security controller where a secondary controller(s) is provided that has alternative communication path(s) to the alarm service. In one or more embodiments, the secondary controller includes one of a Wifi-Cellular bridge and a Digital enhanced cordless telecommunications (DECT) Ultra Low Energy (DECT/ULE) cellular bridge. The main controller can establish communication with the secondary controller(s) via the Wifi connection or Dect/Ule connection or Bluetooth® connection or a Bluetooth®/BLE-Cellular bridge. There can be a single or multiple secondary controller(s) in the security system where the secondary controllers may utilize the same communication type or a mix of the communication types described herein.

When the security system enters the entry delay window, the main controller establishes communication with the secondary controller, and sends a pending alarm event registration to the secondary controller. The registration may include the type of alarm event, the required attributes, an expiration time, and necessary information to report the alarm to the alarm service.

In case the user correctly disarms the system, the main controller sends a cancellation to the secondary controller. The secondary controller(s) will not report the alarm to the alarm service. When the event expires without cancellation, the secondary controller(s) report the alarm to the alarm service.

Before describing in detail exemplary embodiments, it is noted that the embodiments may reside in combinations of apparatus components and processing steps related to premises security systems and in particular to performing backup and/or redundancy related functionality during a premises security event. Accordingly, the system and method components have been represented where appropriate by conventional symbols in the drawings, focusing only those specific details that facilitate understanding the embodiments of the present disclosure so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In some embodiments, the general description elements in the form of "one of A and B" corresponds to A or B. In some embodiments, at least one of A and B corresponds to A, B or AB, or to one or more of A and B. In some embodiments, at least one of A, B and C corresponds to one or more of A, B and C, and/or A, B, C or a combination thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

Referring now to the drawing figures in which like reference designators refer to like elements there is shown in FIG. 1 a system designated generally as "10." System 10 may include premises security system 11 where premises security system 11 includes and/or is associated with one or more user interface devices 12a to 12n (collectively referred to as "user interface device 12"), one or more premises devices 14a to 14n (collectively referred to as "premises device 14"), control device 16 (e.g., on-site primary control device 16), and one or more secondary controllers 17a to 17n (collectively referred to as "secondary controller 17" and/or "on-site secondary control device 17"). As used herein, "controller" and "control device" are used interchangeably. System 10 may further include one or more networks 18a to 18n (collectively referred to as "network 18"), and one or more remote monitoring centers 20a to 20n (collectively referred to as "remote monitoring center 20"), communicating with each other or with at least one other entity in system 10.

User interface device 12 may be a wireless device that allows a user to communicate with control device 16. User interface device 12 may be a portable control keypad/interface, computer, mobile phone and tablet, among other devices that allow a user to interface with control device 16 and/or one or more premises devices 14. User interface device 12 may communicate at least with control device 16 using one or more wired and/or wireless communication protocols. For example, in embodiments where the user interface device 12 is a portable control keypad, the user interface device 12 may communicate with control device 16 via a ZigBee based communication link, e.g., a network based on Institute of Electrical and Electronics Engineers (IEEE) 802.15.4 protocols, and/or a Z-wave based communication link, or over the premises' local area network, e.g., a network-based on IEEE 802.11 protocols.

Premises devices 14 may include one or more types of sensors, control and/or image capture devices. For example, the types of sensors may include various safety related sensors such as motion sensors, fire sensors, carbon monoxide sensors, flooding sensors and contact sensors, among other sensor types. The control device 16 may include, for example, one or more lifestyle (e.g., home automation) related devices configured to adjust at least one premises setting such as lighting, temperature, energy usage, door lock and power settings, among other settings associated with the premises or devices on the premises. Image capture devices may include a digital camera and/or video camera, among other image captures devices. Premises device 14 may communicate with control device 16 via wireless communication protocols, including but not limited to the Wi-Fi wireless communication protocol. Various additional sensors and control and/or image capture devices may relate to life safety or lifestyle depending on both what the sensors, control and image capture devices do and how these sensors, control and image devices are used by system 10.

Premises devices 14 may include one or more types of sensors, microphones, control and/or image capture devices. For example, the types of sensors may include various safety related sensors such as motion sensors, fire sensors, carbon monoxide sensors, flooding sensors and contact sensors, among other sensor types. The control devices 16 may include, for example, one or more lifestyle (e.g., home automation) related devices configured to adjust at least one premises setting such as lighting, temperature, energy usage, door lock and power settings, among other settings associated with the premises or devices on the premises. Image capture devices may include a digital camera and/or video camera, among other image captures devices (e.g., infrared or thermal imaging cameras). Premises device 14 may communicate with control device 16 via wireless communication protocols, including but not limited to the Wi-Fi wireless communication protocol. Various additional sensors and control and/or image capture devices may relate to life safety or lifestyle depending on both what the sensors, control and image capture devices do and how these sensors, control and image devices are used by system 10.

Control device 16 may provide one or more of management functions, monitoring functions, analysis functions, control functions such as power management, premises device management and alarm management/analysis, among other functions to the premises security system 11. In particular, control device 16 may manage one or more life safety and lifestyle features. Life safety features may correspond to security system functions and settings associated with premises conditions that may result in life threatening harm to a person such as carbon monoxide detection and intrusion detection. Lifestyle features may correspond to security system functions and settings associated with video capturing devices and non-life-threatening conditions of the premises such as lighting and thermostat functions.

Control device 16 may include an alarm unit 19 for performing control device 16 functions such as receiving/transmitting certain information and data from the premises device 14, performing certain monitoring, configuration and/or control functions associated with the premises security system 11, and/or functions such as security alert determinations/analysis and functionality as described herein. For example, the control device 16 may be in wired and/or wireless communication with the premises device 14. The premises device 14 is configured to trigger and transmit an event signal indicative of a sensed or detected event to the alarm unit 19. For example, the sensed or detected user event may be the detection of a user or intruder entering the premises through a door, window, gate, or other physical barrier restricting access or entry to the premises, among other events. Once the signal is received, the alarm unit 19 is configured to perform one or more monitoring, configuration and/or control functions associated with the premises security system 11 based on the event signal. Additionally, in one or more embodiments, the event signal may include sensor data such as audible, visual, and/or tactile information recorded, measured, or otherwise generated by the premises device 14. For example, in embodiments in which the premises device 14 includes an image capture device and/or a microphone, the premises device 14 may capture audio and video of a user or intruder, within a predetermined time window, entering the premises once the user event is detected (e.g., a user/intruder opening a door or window to enter the premises) where the image, video, data, etc., are transmitted to the control device 16 in the event signal. As described in more detail below, in some embodiments, upon the triggering of the event signal, the individual entering the premises must enter an alarm termination code, password, sequence, biological input, or gesture related input, etc., to the premises device 14 and/or user interface device 12 within an entry window to disarm the security alarm of the premises. As described herein, an "entry window" corresponds to a given interval of time (e.g., predefined time window or period) such as, for example, at least 10-30 seconds, for a user to disarm the premises' security alarm upon entry of the premises. When a user correctly disarms the security alarm, the alarm termination signal is sent to the secondary controller 17 so that the secondary controller 17 does not yet report the alarm event to the remote monitoring center 20.

In one or more embodiments, secondary controller 17 may be an on-site secondary controller 17 (e.g., on-site secondary control device 17) for performing backup and/or redundancy related functionality during a premises security event. Secondary controller 17 may include a command unit 21, processing circuitry 46, etc., for performing secondary controller 17 functions such as receiving and/or transmitting certain information and data from the control device 16, performing certain monitoring, configuration and/or control functions associated with the premises security system 11, and/or functions such as security alert determinations or analysis and functionality as described herein. For example, the secondary controller 17 may be in wireless communication with the control device 16 (e.g., on-site primary control device 16). The control device 16 is configured to transmit an alarm event signal indicative of the triggering of a premises security system 11 alarm during the entry window security alarm for the premises to the secondary controller 17. Once the signal is received, the secondary controller 17 is configured to perform one or more monitoring, configuration and/or control functions associated with the premises security system 11 based on the received alarm event signal. As described, in more detail below, in some embodiments, command unit 21 is configured to instruct the secondary controller 17 to at least temporarily store the alarm event signal until one or more criteria are met, which will determine whether or not the alarm event signal should be transmitted by the secondary controller 17 to another entity such as the remote monitoring center 20, or should be discarded.

Control device 16 may communicate with the secondary controller 17 and network 18 via one or more communication links. In particular, a first communication link 22n between control device 16 and secondary controller 17 may be a low power and short distance communication protocol such as, for example, Wi-Fi (22a), Dect Ultra Low Energy (Dect/ULE) (22b), or Bluetooth® (22c). Control device 16 may be configured to determine which communication protocol to use when in communication with the secondary controller 17. For example, the control device 16 may determine which communication protocol has the greatest connection strength, and therefore may default to that particular communication protocol over other protocols. Additionally, if control device 16 has established a communication link with secondary controller 17 using a first communication protocol, the control device 16 may evaluate the quality or strength of the communication link and switch to a second communication protocol if there is a disruption or weaking of the first communication protocol so that information (e.g., alarm event signals and alarm termination signals) may be sent to the secondary controller 17 for at least temporary storage.

In one or more embodiments, the secondary controller 17 may be a WiFi-Cellular bridge, e.g., a device which provides an interconnection and/or translation between a Wi-Fi protocol and/or network and a cellular protocol and/or network, such that the control device 16 can establish communication with the secondary controller 17 via the Wi-Fi connection.

In one or more embodiments, the secondary controller 17 may be a DECT/ULE-cellular bridge e.g., a device which provides an interconnection and/or translation between a DECT/ULE protocol and/or network and a cellular protocol and/or network. The control device 16 can establish communication with the secondary controller 17 via the DECT ULE connection.

In one or more embodiments, the secondary controller 17 may be a mobile cellular device.

In one or more embodiments, the secondary controller 17 may be a Bluetooth/BLE-cellular bridge e.g., a device which provides an interconnection and/or translation between a Bluetooth/BLE protocol and/or network and a cellular protocol and/or network. The control device 16 may establish communication with the secondary controller 17 via the Bluetooth® connection.

A second communication link 23 between control device 16 and network 18, and a third communication link 24 between secondary controller 17 and network 18, may each be broadband communication link such as a wired cable modem or Ethernet communication link, and digital cellular communication link, e.g., long term evolution (LTE, also referred to as 4G) and/or New Radio (NR, also referred to as 5G) based link, among other communication links known in the art. Broadband as used herein may refer to a communication link other than a plain old telephone service (POTS) line. Ethernet communication link may be an IEEE 802.3 or 802.11 based communication link. Network 18 may be a wide area network, local area network, wireless local network and metropolitan area network, among other networks known in the art. Network 18 provides communications between control device 16 and remote monitoring center 20, and communications between secondary controller 17 and remote monitoring center 20. In one or more embodiments, control device 16 may be part of premises device 14 or user interface device 12.

While control device 16 is illustrated as being a separate device from user interface device 12 and premises device 14, in one or more embodiments, control device 16 may be integrated with one or more user interface devices 12 and/or premises devices 14 and/or other entity/device located at premises associated with premises security system 11.

While secondary controller 17 is described herein as being in communication with the control device 16, it is to be understood that secondary controller 17 may also be in wired and/or wireless communication with user interface device 12 and/or premises device 14 such that signals, data, and/or audible, visual, and tactile information may be transmitted from either user interface device 12 or premises device 14, may also be transmitted directly to secondary controller 17.

Example implementations, in accordance with one or more embodiments, of control device 16 and secondary controller 17 discussed in the preceding paragraphs will now be described with reference to FIG. 2.

The system 10 includes a control device 16 that includes hardware 28 enabling the control device 16 to communicate with one or more entities in system 10 and to perform one or more functions described herein. The hardware 28 may include a communication interface 30 for setting up and maintaining at least a wired and/or wireless connection (e.g., wireless connections 22, 23, 24 etc.) to one or more entities in system 10 such as remote monitoring center 20, premises device 14, user interface device 12, etc.

In the embodiment shown, the hardware 28 of the control device 16 further includes processing circuitry 34. The processing circuitry 34 may include a processor 36 and a memory 38. In particular, in addition to or instead of a processor, such as a central processing unit, and memory, the processing circuitry 34 may comprise integrated circuitry for processing and/or control, e.g., one or more processors and/or processor cores and/or field programmable gate arrays (FPGAs) and/or application specific integrated circuits (ASICs) adapted to execute instructions. The processor 36 may be configured to access (e.g., write to and/or read from) the memory 38, which may comprise any kind of volatile and/or nonvolatile memory, e.g., cache and/or buffer memory and/or random access memory (RAM) and/or read-only memory (ROM) and/or optical memory and/or erasable programmable read-only memory (EPROM).

Thus, the control device 16 further has software 40 stored internally in, for example, memory 38, or stored in external memory (e.g., database, storage array, network storage device, etc.) accessible by the control device 16 via an external connection. The software 40 may be executable by the processing circuitry 34. The processing circuitry 34 may be configured to control any of the methods and/or processes described herein and/or to cause such methods, and/or processes to be performed, e.g., by control device 16. Processor 36 corresponds to one or more processors 36 for performing control device 16 functions described herein. The memory 38 is configured to store data, programmatic software code and/or other information described herein. In some embodiments, the software 40 may include instructions that, when executed by the processor 36 and/or processing circuitry 34, causes the processor 36 and/or processing circuitry 34 to perform the processes described herein with respect to control device 16. For example, processing circuitry 34 of the control device 16 may include alarm unit 19 which is configured to perform one or more control device 16 functions described herein such as with respect to alarm activation and deactivation determinations and/or other alarm phase based actions.

Figure 2:
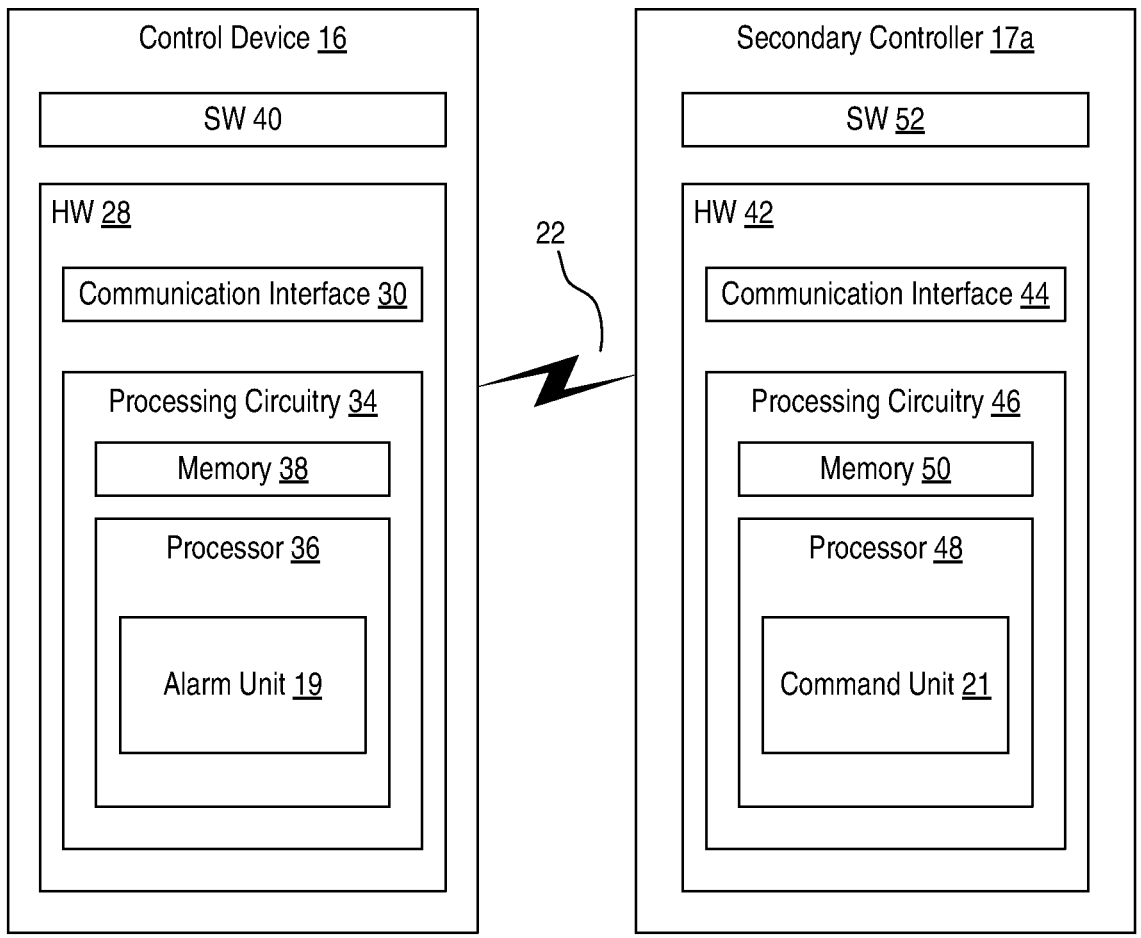
FIG. 2 is a diagram of a control device and a secondary controller in the system according to some embodiments of the present disclosure.

Although FIGS. 1 and 2 show alarm unit 19 as being within a respective processor, this unit may be implemented such that a portion of the unit is stored in a corresponding memory within the processing circuitry. In other words, the unit may be implemented in hardware or in a combination of hardware and software within the processing circuitry.

Example implementations, in accordance with one or more embodiments, of secondary controller 17 discussed in the preceding paragraphs will now be described with reference to FIG. 2.

The system 10 includes a secondary controller 17 that includes hardware 42 enabling the secondary controller 17 to communicate with one or more entities in system 10 and to perform one or more functions described herein. The hardware 42 may include a communication interface 44 for setting up and maintaining at least a wired and/or wireless connection to one or more entities in system 10 such as remote monitoring center 20 and control device 16.

In the embodiment shown, the hardware 42 of the secondary controller 17 further includes processing circuitry 46. The processing circuitry 46 may include a processor 48 and a memory 50. In particular, in addition to or instead of a processor, such as a central processing unit, and memory, the processing circuitry 46 may comprise integrated circuitry for processing and/or control, e.g., one or more processors and/or processor cores and/or field programmable gate arrays (FPGAs) and/or application specific integrated circuits (ASICs) adapted to execute instructions. The processor 36 may be configured to access (e.g., write to and/or read from) the memory 38, which may comprise any kind of volatile and/or nonvolatile memory, e.g., cache and/or buffer memory and/or random access memory (RAM) and/or read-only memory (ROM) and/or optical memory and/or erasable programmable read-only memory (EPROM).

Thus, the secondary controller 17 further has software 52 stored internally in, for example, memory 50, or stored in external memory (e.g., database, storage array, network storage device, etc.) accessible by the secondary controller 17 via an external connection. The software 52 may be executable by the processing circuitry 46. The processing circuitry 46 may be configured to control any of the methods and/or processes described herein and/or to cause such methods, and/or processes to be performed, e.g., by secondary controller 17. Processor 48 corresponds to one or more processors 48 for performing secondary controller 17 functions described herein. The memory 50 is configured to at least temporarily store data, programmatic software code and/or other information described herein such as an alarm event signal and/or associated alarm information/data. In some embodiments, the software 52 may include instructions that, when executed by the processor 48 and/or processing circuitry 46, causes the processor 48 and/or processing circuitry 46 to perform the processes described herein with respect to secondary controller 17. For example, processing circuitry 46 of the secondary controller 17 may include command unit 21 which is configured to perform one or secondary controller 17 functions described herein such as with respect to storing and determining whether the alarm event signal should be transmitted to the remote monitoring center 20 based on whether a criteria is met, or whether the stored alarm event signal should be discarded.

In another example, processing circuitry 46 of the secondary controller 17 may optionally include alarm unit 19 where secondary controller 17 may be configured to take over control device 16 functionality after determining a criteria has been met where the criteria indicates the control device 16 has been disabled. In this case, the secondary controller 17 may continue the countdown for disarming the timer and/or receive event signals from premises devices 14. Further, the secondary controller 17 may indicate to the premises devices 14 and/or user interface device 12 that it is taking over control device 16 functionality such that one or more of these user interface and premises devices 14 may begin to send the event signal and/or other data to the secondary controller 17.

When the system 10 has entered the entry delay window for a user to disarm the system 10, the control device 16 establishes communication with the secondary controller 17 and sends a pending alarm event registration. The registration may include the type of alarm event, the required attributes necessary to disarm or disengage the premises' security alarm, an expiration time and necessary information to report the alarm to the alarm service. In case the user correctly disarmed the system, the control device 16 sends a cancellation or termination signal to the secondary controller 17. The secondary controller(s) 17 will not report the alarm to the remote monitoring center 20. When the event expired without cancellation, the secondary controller(s) 17 report the alarm to the remote monitoring center 20.

Figure 3:
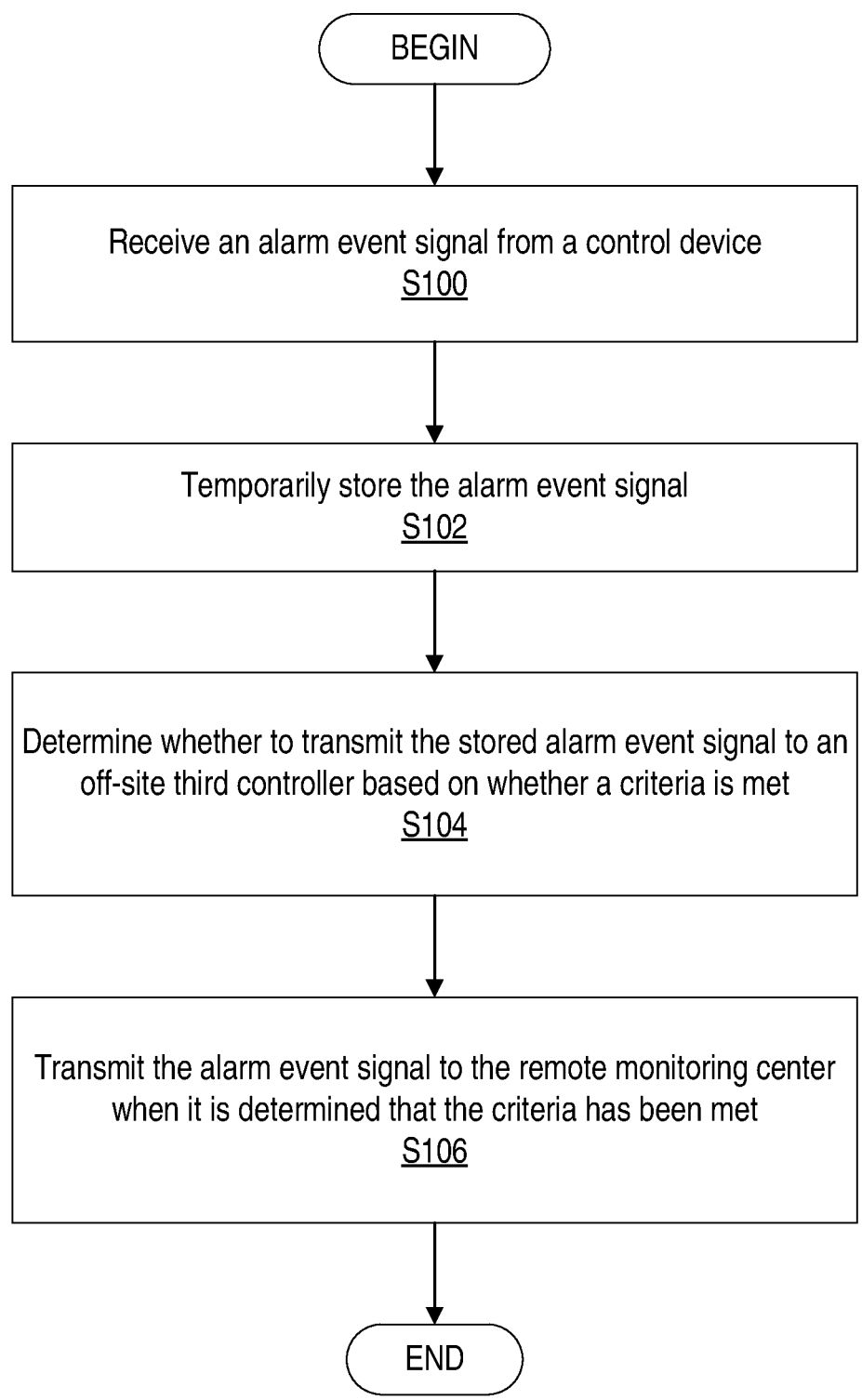
FIG. 3 is a flowchart of an example process in the secondary controller according to some embodiments of the present disclosure.

FIG. 3 is a flowchart of an example process in an on-site secondary controller 17 according to one or more embodiments of the present invention. One or more blocks described herein may be performed by one or more elements of secondary controller 17 such as by one or more of processing circuitry 46 (including the command unit 21), processor 48, etc. Secondary controller 17 is in communication with a control device 16 in a premises security system 11. Secondary controller 17 is configured to receive an alarm event signal from control device 16 (Block S100), and at least temporarily store the alarm event signal in memory 50 (Block S102). In one or more embodiments, the alarm event signal includes sensor data including at least one of audible, visual, and tactile information generated by a premises device 14 within a predetermined time window. Once the alarm event signal is stored within memory 50, the secondary controller 17 is configured to determine whether to transmit the stored alarm event signal to an off-site third controller, such as remote monitoring center 20 based on whether a criteria is met (Block S104). When it is determined that the criteria has been met, the secondary controller 17 is configured to transmit the alarm event signal to the remote monitoring center 20 (Block S106).

According to one or more embodiments, "on-site" corresponds to secondary controller 17 being integrated with one or more user interface devices 12 and/or premises devices 14 and/or other entity/device located at premises associated with premises security system 11. Additionally and/or alternatively, on-site may correspond to the secondary controller 17 being located at a premises associated with premises security system 11, but not integrated with one or more user interface devices 12 and/or premises devices 14 and/or other entity/device located at premises associated with premises security system 11. Further, in one or more embodiments, off-site corresponds to secondary controller 17 not being located at a premises associated with the premises security system 11, and not being integrated with one or more user interface devices 12 and/or premises devices 14 and/or other entity/device located at premises associated with premises security system 11.

According to one or more embodiments, the criteria may be met when: a connection between the secondary controller 17 and control device 16 is at least temporarily disrupted; an alarm termination signal has not been received by the secondary controller 17 from the control device 16 within a predetermined interval of time (e.g., the entry window has expired); an adverse event (e.g., mechanical or electrical failure) affecting the on-site secondary controller 17 is detected; and an alarm trigger signal is received by the secondary controller 17 from the control device 16. In one or more embodiments, it may be determined by the secondary controller 17 that the connection (i.e., communication link) between the secondary controller 17 and the control device 16 is at least temporarily disrupted when, for example, the strength of the communication link falls below a threshold or baseline value, or when the signal to interference and noise ratio (SINR) goes above a second threshold.

In one or more embodiments, mechanical failure may be detected when, for example, an accelerometer in control device 16 detects motion indicative of the control device 16 being thrown or smashed, etc., and electrical failure may be detected when, for example, an embedded power supply or connection to an external power source is weakened, disrupted, smashed, or otherwise lost. In one or more embodiments, the criteria may correspond to the control device 16 receiving a predefined code from a control panel where the predefined code stops the audio and/or visual alarm warnings to mimic a disarm state, but in reality the predefined code triggers the alarm event signal to be immediately transmitted from the secondary controller 17 to an off-site controller. Such a predefined code may be useful in case the intruder is forcing or coercing the user to disarm the system.

In some configurations, the secondary controller 17 may also receive an alarm trigger signal from the user interface device and/or premises device 14. Based on which condition of the criteria is met, an associated action is performed by the command unit 21. For example, when the condition is met, the secondary controller 17 transmits the alarm event signal to the remote monitoring center 20. In one or more embodiments, premises security system 11 may include a plurality of secondary controllers 17 where one or more of these secondary controllers 17 receive the alarm event signal either directly from the control device 16 or from another secondary controller 17. Each secondary controller 17 may perform the process of FIG. 3 such as to provide added redundancy. In one example, one secondary controller 17 may communicate with remote monitoring center 20 (which may be "off-site") via Wi-Fi communication while another secondary controller 17 may communicate with remote monitoring center 20 via cellular communication (e.g., 4G, 5G, etc.). Therefore, even if one communication link such as the Wi-Fi link is disabled such as by cutting power to the premises, at least one secondary controller 17 will still be able to transmit the alarm event to the remote monitoring center 20 via the cellular communication link.

In one or more embodiments, the plurality of secondary controllers 17 may use a round-robin approach for transmitting the alarm event signal where if one secondary controller 17 is unable to transmit the alarm event signal, the secondary controller 17 requests and/or causes another secondary controller 17 to attempt to transmit the alarm event signal to the remote monitoring center 20, and so forth, until the alarm event signal has been transmitted or all secondary controllers 17 have tried to transmit the signal.

According to one or more embodiments, the entry window corresponds to a given interval of time (e.g., predefined time window or period) such as, for example, at least 10-30 seconds, for a user to disarm the premises' security alarm upon entry of the premises. When a user correctly disarms the security alarm, the alarm termination signal is sent to the secondary controller 17 so that the secondary controller 17 does not report the alarm event to the remote monitoring center 20. According to one or more embodiments, the predetermined time window may correspond to one of at least second, at least one minute, at least one day, at least one week, and at least one month prior to, during, and/or after the event signal has been triggered.

Figure 4:
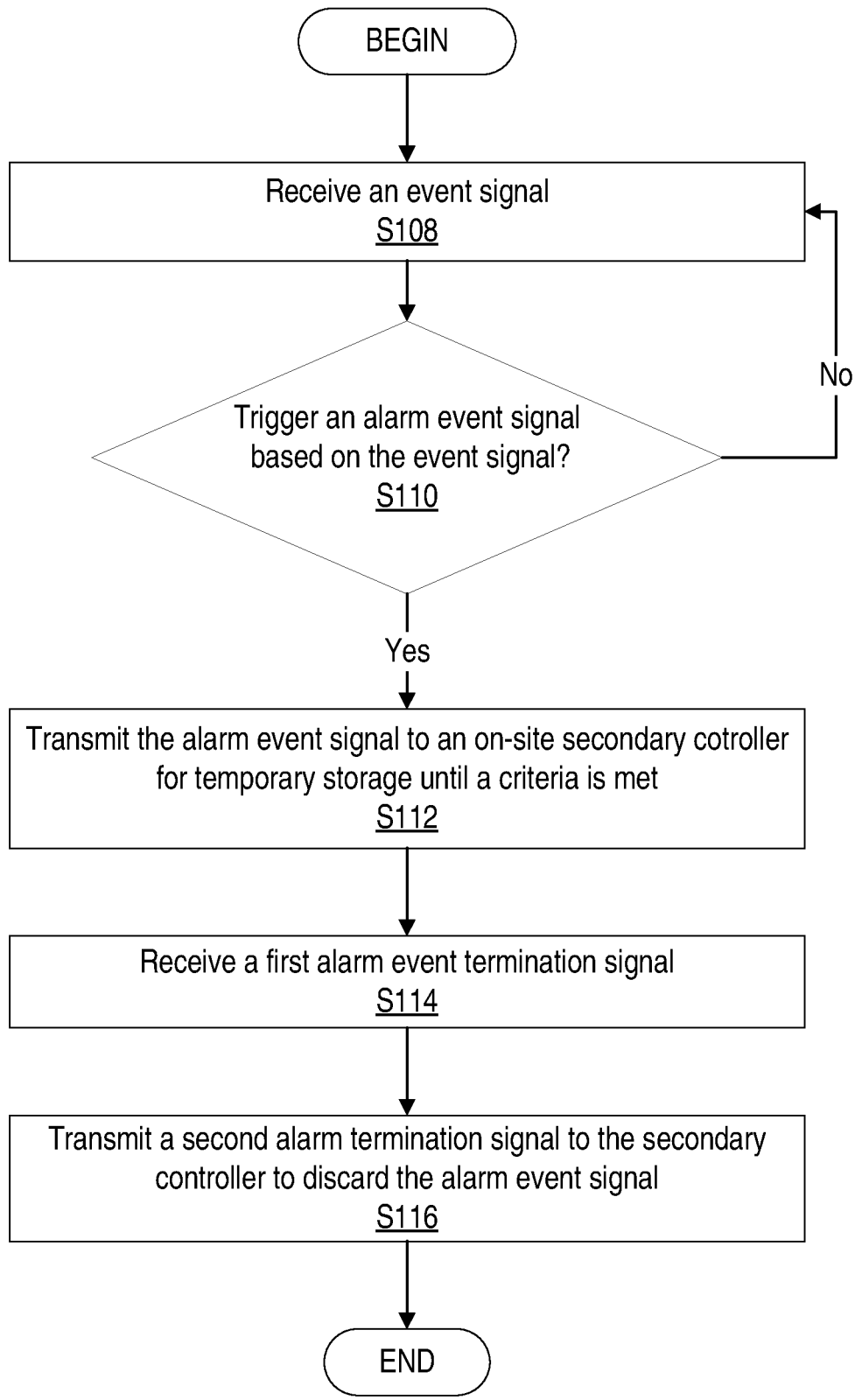
FIG. 4 is a flowchart of an example process in the control device according to some embodiments of the present disclosure.

FIG. 4 is a flowchart of an example process in a control device 16 according to one or more embodiments of the present invention. One or more blocks described herein may be performed by one or more elements of control device 16 such as by one or more of processing circuitry 34 (including the alarm unit 19), processor 36, etc. Control device 16 is configured to receive an event signal from a premises device 14 (Block S108), and determine whether to generate or trigger an alarm event signal based on information received in the event signal (Block S110). If it is determined that the alarm event signal should be triggered, the control device 16 may then transmit the alarm event signal to an on-site secondary controller 17 for at least temporary storage until a criteria is met to perform at least one action associated with the criteria (Block S112). The event signal and/or the alarm event signal may each include sensor data including at least one of audible, visual, and tactile information generated by a premises device 14 within a predetermined time window. As such, the control device 16 may be configured to determine whether to trigger the alarm event signal based on the information included in the sensor data. The control device 16 is further configured to receive a first alarm event termination signal (Block S114), and subsequently transmit a second alarm event termination signal to the secondary controller 17 to cause the secondary controller 17 to disregard the alarm event signal (Block S116). In one or more embodiments, Block S114 and S116 are optional steps.

According to one or more embodiments, the alarm event signal transmitted by control device 16 to a secondary controller 17 may include information associated with the type of alarm event, the required attributes necessary to disarm or disengage the premises' security alarm, the duration of the entry window to disarm the security alarm, and the necessary information for reporting the alarm event to the remote monitoring center 20.

According to one or more embodiments, disregarding the alarm event signal may involve the secondary controller 17 not taking an action that the secondary controller 17 would otherwise take in response to the alarm event signal. For example, the secondary controller 17 may disregard the alarm event signal by not notifying the remote monitoring center 20 of an alarm even upon the expiration of the entry delay window. In another embodiment, the secondary controller 17 may disregard the alarm event signal by discarding the alarm event signal from memory. In another embodiment, the secondary controller 17 may disregard the alarm event signal by storing information indicating that the alarm event signal has been resolved and that the secondary controller 17 is not to notify the remote monitoring center 20 of the alarm event.

Figure 5:
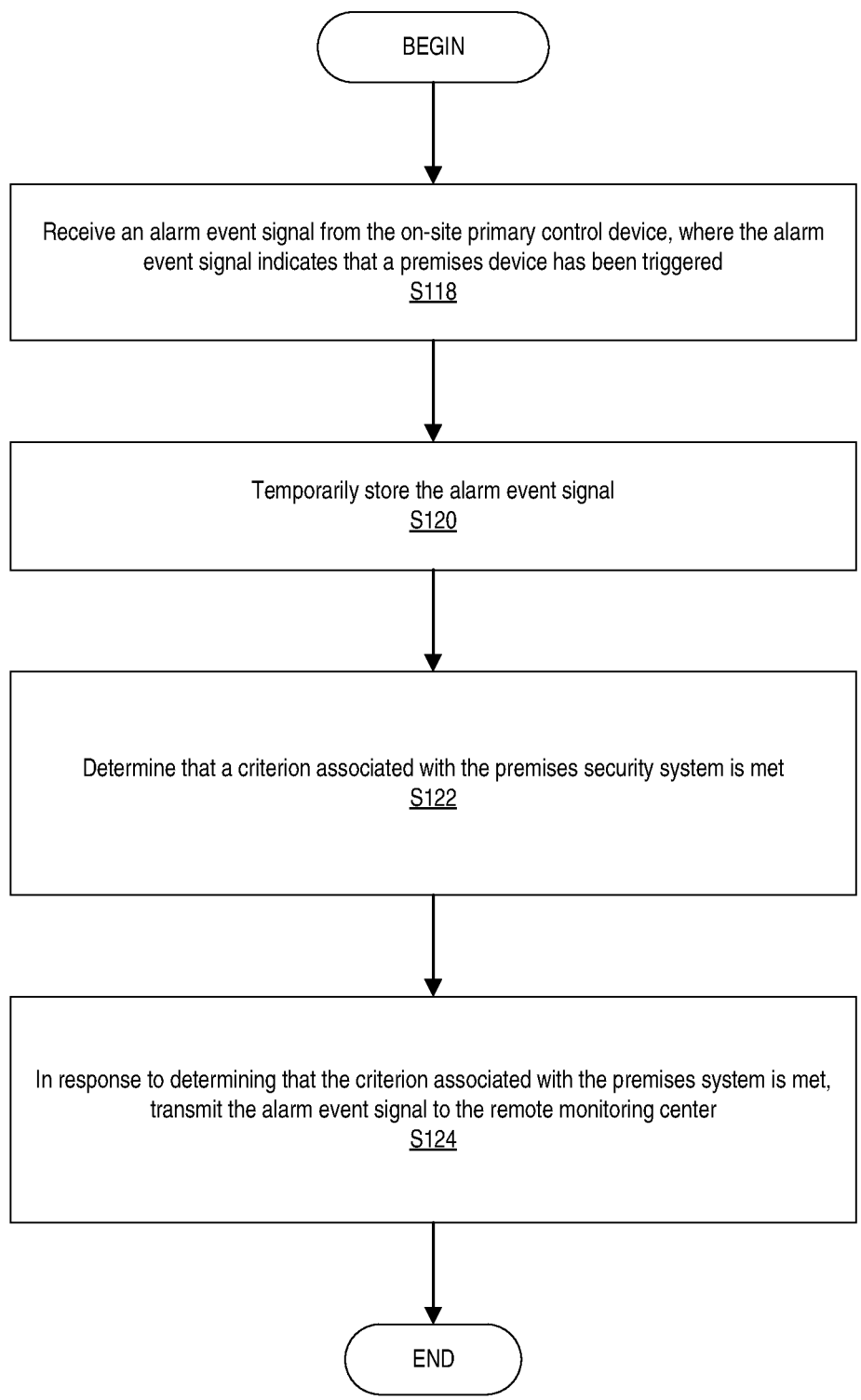
FIG. 5 is a flowchart of another example process in the secondary controller according to some embodiments of the present disclosure.

FIG. 5 is a flowchart of an example process in a secondary controller 17 (e.g., an on-site secondary control device 17) according to one or more embodiments of the present invention. One or more blocks described herein may be performed by one or more elements of on-site secondary control device 17 such as by one or more of processing circuitry 46 (including the command unit 21), processor 48, etc. The on-site secondary control device 17 is configured to communicate with a control device 16 (e.g., an on-site primary control device 16) of a premises security system 11, where the on-site primary control device 16 is configured to trigger an alarm event signal associated with the premises security system 11, and the on-site secondary control device 17 is physically separated from the on-site primary control device 16. On-site secondary control device 17 is configured to receive (Block S118) an alarm event signal from the on-site primary control device indicating that a premises device has been triggered. On-site secondary control device 17 is configured to temporarily store (Block S120) the alarm event signal. On-site secondary control device 17 is configured to determine (Block S122) that a criterion associated with the premises security system is met. On-site secondary control device 17 is configured to transmit (Block S124) the alarm event signal to the remote monitoring center in response to determining that the criterion associated with the premises system is met.

According to one or more embodiments, the criterion comprises at least one of a wireless connection between the on-site secondary control device 17 and the on-site primary control device 16 is determined to be at least temporarily disrupted, a predetermined interval of time has expired, one of a mechanical failure or an electrical failure at one of the on-site secondary control device 17 or the on-site primary control device 16 is detected, or an alarm trigger signal including a predefined code entered by a user is received. According to one or more embodiments, the criterion comprises at least one of a signal strength of a connection between the on site secondary control device 17 and the on site primary control device 16 being below a first threshold value, or a signal to interference and noise ratio of the connection between the on site secondary control device 17 and the on site primary control device 16 being below a second threshold value. According to one or more embodiments, the criterion comprises a power level of the on site primary control device 16 or the on site secondary control deice 17 being below a threshold. According to one or more embodiments, the criterion comprises an accelerometer of one of the on site primary control device 16 or the on site secondary control device 17 detecting an acceleration greater than a threshold value. According to one or more embodiments, the alarm event signal comprises at least one of information associated with a type of alarm event, a required attribute to disarm the premises security system 11, or information indicating a predetermined interval of time to disarm the premises security system 11. According to one or more embodiments, the on site secondary control device 17 is configured to communicate with the remote monitoring center 20 via a first communication protocol, and the on site secondary control device 17 is configured to communicate with the on site primary control device 16 via a second communication protocol, the first communication protocol being different from the second communication protocol.

Figure 6:
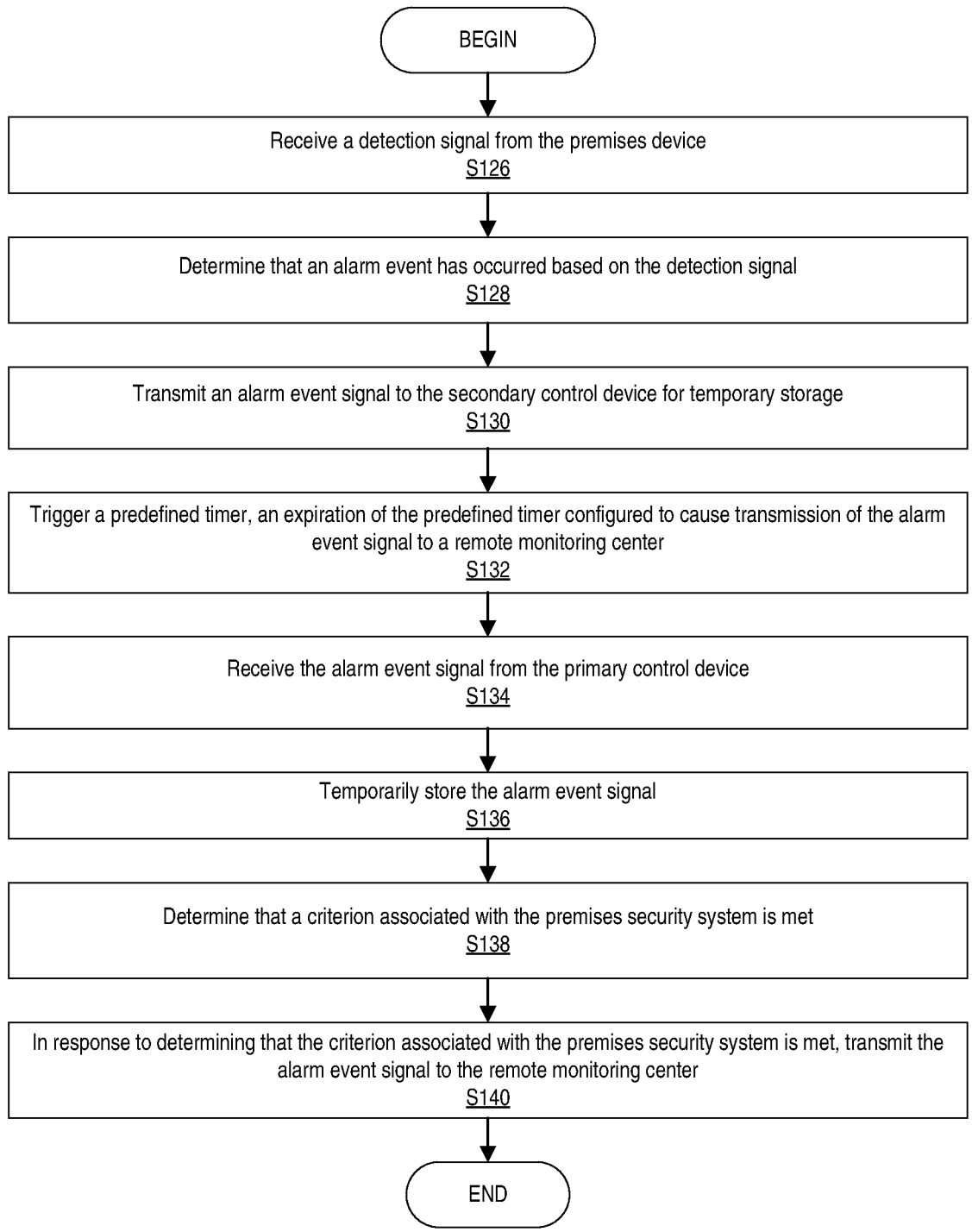
FIG. 6 is a flowchart of another example process in the control device according to some embodiments of the present disclosure.

FIG. 6 is a flowchart of an example process in a premises security system 11 including a premises device 14, an on-site primary control device 16, and on-site secondary control device 17, according to one or more embodiments of the present invention. One or more blocks described herein may be performed by one or more elements of premises device 14, by one or more elements of on-site primary control device 16 such as by one or more of processing circuitry 34 (including alarm unit 19), processor 36, etc., and by one or more elements of on-site secondary control device 17, such as by one or more of processing circuitry 46 (including the command unit 21), processor 48, etc. The on-site primary control device 16 is configured to communicate with the premises device 14 and the on-site secondary control device 17, where the secondary controller is physically separated from the control device. The on-site primary control device 16 is configured to receive (Block S126) a detection signal from the premises device. The on-site primary control device 16 is configured to determine (Block S128) that an alarm event has occurred based on the detection signal. The on-site primary control device 16 is configured to transmit (Block S130) an alarm event signal to the secondary control device 17 for temporary storage. The on-site primary control device 16 is configured to trigger (Block S132) a predefined timer, an expiration of the predefined timer configured to cause transmission of the alarm event signal to a remote monitoring center 20. The on-site secondary control device 17 is configured to receive (Block S134) the alarm event signal from the primary control device. The on-site secondary control device 17 is configured to temporarily store (Block S136) the alarm event signal. The on-site secondary control device 17 is configured to determine (Block S138) that a criterion associated with the premises security system is met. The on-site secondary control device 17 is configured to transmit (Block S140) the alarm event signal to the remote monitoring center 20 in response to determining that the criterion associated with the premises security system 11 is met.

According to one or more embodiments, the criterion comprises at least one of a wireless connection between the on-site secondary control device 17 and the on-site primary control device 16 is determined to be at least temporarily disrupted, a predetermined interval of time has expired, one of a mechanical failure or an electrical failure at one of the on-site secondary control device 17 or the on-site primary control device 16 is detected, or an alarm trigger signal including a predefined code entered by a user is received. According to one or more embodiments, the criterion comprises at least one of a signal strength of a connection between the on site secondary control device 17 and the on site primary control device 16 being below a first threshold value, or a signal to interference and noise ratio of the connection between the on site secondary control device 17 and the on site primary control device 16 being below a second threshold value. According to one or more embodiments, the criterion comprises a power level of the on site primary control device 16 or the on site secondary control deice 17 being below a threshold. According to one or more embodiments, the criterion comprises an accelerometer of one of the on site primary control device 16 or the on site secondary control device 17 detecting an acceleration greater than a threshold value. According to one or more embodiments, the alarm event signal comprises at least one of information associated with a type of alarm event, a required attribute to disarm the premises security system 11, or information indicating a predetermined interval of time to disarm the premises security system 11. According to one or more embodiments, the on site secondary control device 17 is configured to communicate with the remote monitoring center 20 via a first communication protocol, and the on site secondary control device 17 is configured to communicate with the on site primary control device 16 via a second communication protocol, the first communication protocol being different from the second communication protocol.

Having described the general process flow of arrangements of the disclosure and having provided examples of hardware and software arrangements for implementing the processes and functions of the disclosure, the sections below provide details and examples of arrangements for additional embodiments of premises security systems using secondary controller(s) for performing backup and/or redundancy related functionality during a premises security event.

Figure 7:
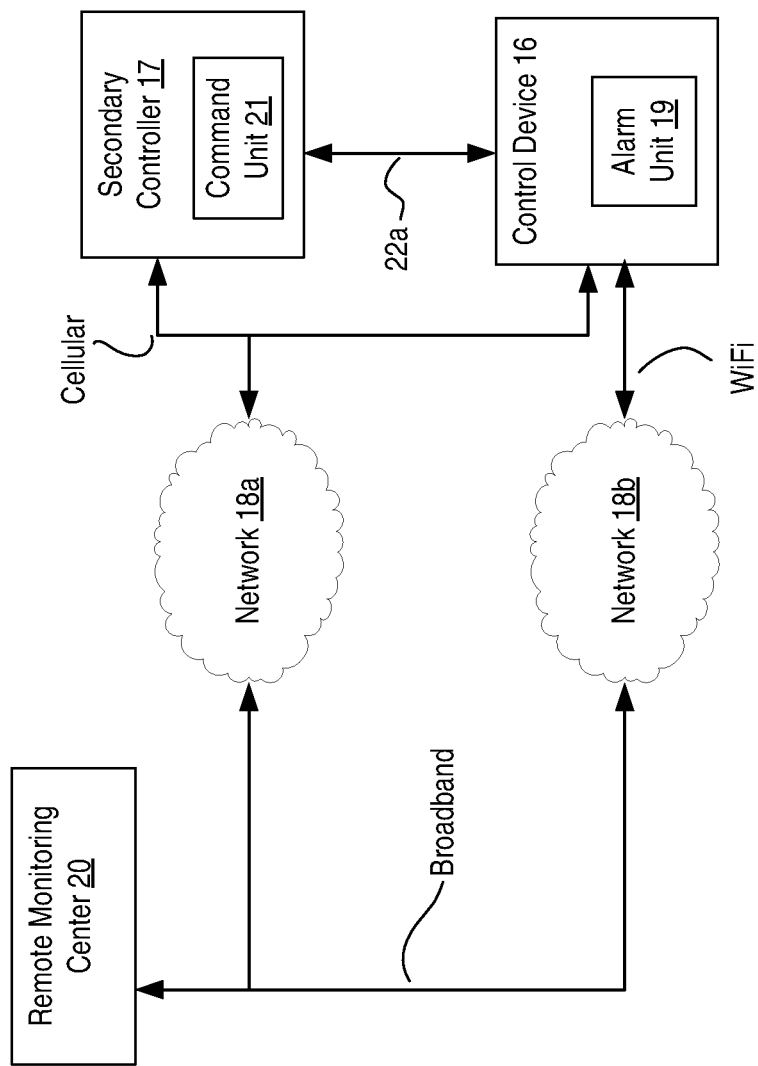
FIG. 7 is an example premises security system configuration according to some embodiments of the present disclosure.

Referring now to FIG. 7, in some embodiments the control device 16 may include a Wi-Fi modem and the secondary controller 17 (which may include a Wi-Fi/cellular bridge), may include a Wi-Fi modem acting as a hotspot, a backup battery, and an active cellular modem. In these embodiments, the communication between the control device 16 and the secondary controller 17 may be encrypted using a proprietary protocol. As shown in FIG. 7, control device 16 and secondary controller 17 are in communication via the first communication link 22a that utilizes Wi-Fi connection. Additionally, the remote monitoring center 20 is in communication with the secondary controller 17 via the cellular connection in cell Network 18a, and the remote monitoring center 20 is in communication with the control device 16 via the broadband connection in broadband Network 18b. When an alarm is triggered, and the system 10 is entering an entry delay window, the control device 16 may iterate through the connected secondary control devices to send a pending alarm registration or alarm event signal. The secondary controller(s) 17 may then receive the alarm registration or event signal and begin the expiration countdown. The secondary controller 17 may establish connection to the remote monitoring center 20 via Network 18a. If the countdown expires, the secondary controller 17 may immediately report the pending alarm to the remote monitoring center 20.

Figure 8:
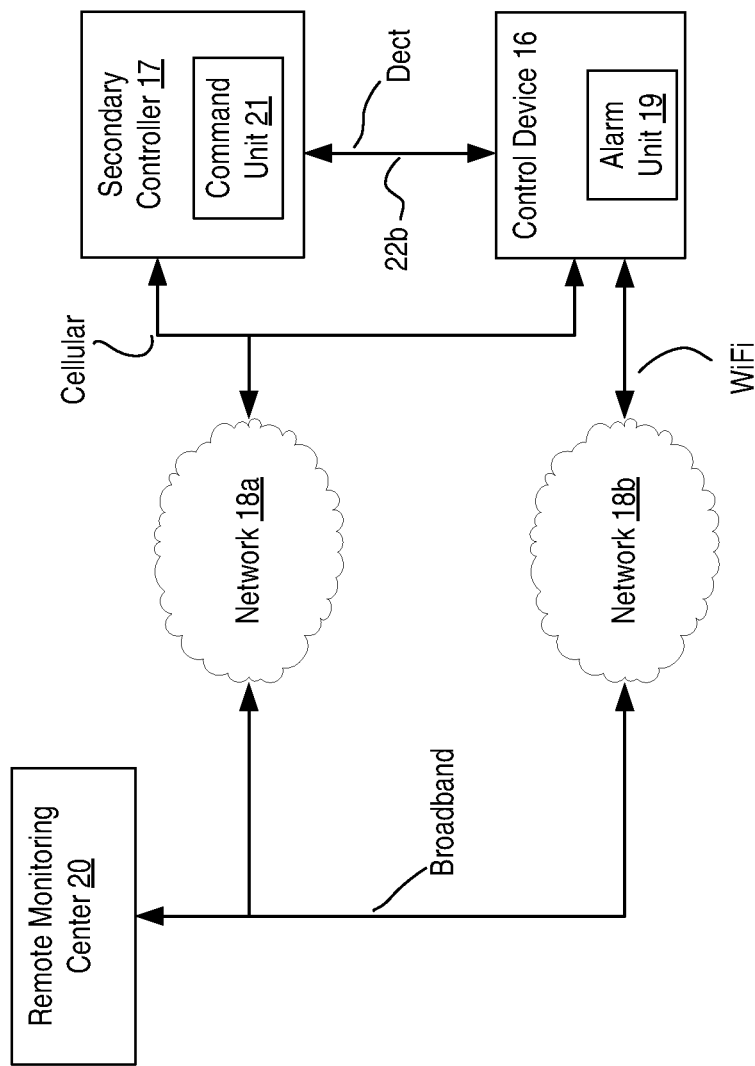
FIG. 8 is another example premises security system configuration according to some embodiments of the present disclosure.

Referring now to FIG. 8, in one or more embodiments, in some embodiments, the control device 16 may include a Wi-Fi modem and the secondary controller 17 (which may include DECT/ULE-cellular bridge), may include a DECT/ULE radio, a backup battery, and an active cellular modem. In these embodiments, the communication between the control device 16 and the secondary controller 17 may be encrypted using a proprietary protocol. As shown in FIG. 8, control device 16 and secondary controller 17 are in communication via the first wireless connection 22b that utilizes a DECT/ULE connection. Additionally, the remote monitoring center 20 is in communication with the secondary controller 17 via the cellular connection in cell Network 18a, and the remote monitoring center 20 is in communication with the control device 16 via the broadband connection in broadband Network 18b. When an alarm is triggered, and the system 10 is entering an entry delay window, the control device 16 may iterate through the connected secondary controller 17 to send a pending alarm registration or alarm event signal. The secondary controller 17 may then receive the alarm registration or event signal and begin the expiration countdown. The secondary controller 17 may establish connection to the remote monitoring center 20 via the cellular connection Network 18a. If the countdown expires, the secondary controller 17 may immediately report the pending alarm to the remote monitoring center 20.

Figure 9:
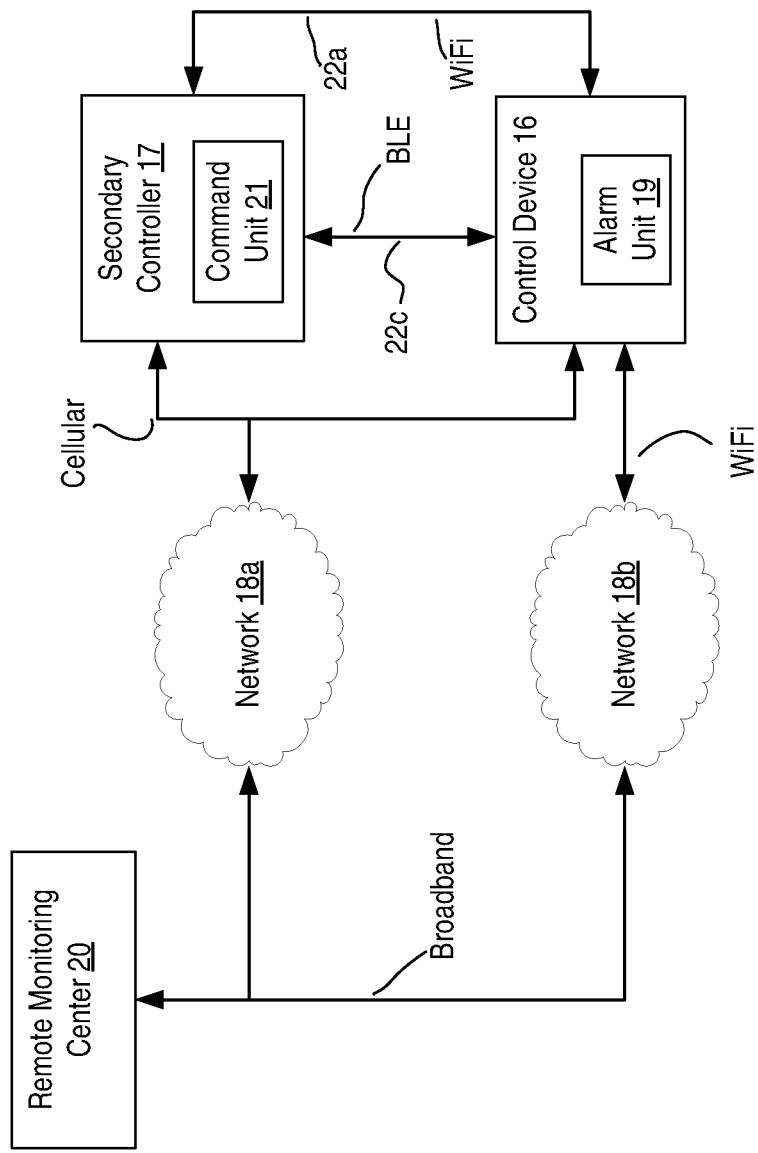
FIG. 9 is another example premises security system configuration according to some embodiment of the present disclosure.

Referring now to FIG. 9, in one or more embodiments, in some embodiments, the control device 16 may include a Wi-Fi modem and a Bluetooth® BLE modem, and the secondary controller 17 (which may include a mobile cellular device) may include a Bluetooth® BLE radio, a Wi-Fi radio connection, backup battery, and active cellular modem. In these embodiments, the communication between the control device 16 and the secondary controller 17 may be encrypted using a proprietary protocol. As shown in FIG. 9, control device 16 and secondary controller 17 are in communication via the first communication link 22a that utilizes Wi-Fi connection and the first communication link 22c that utilizes Bluetooth®/BLE connection. Additionally, the remote monitoring center 20 is in communication with the secondary controller 17 via the cellular connection in cell Network 18a, and the remote monitoring center 20 is in communication with the control device 16 via the broadband connection in broadband Network 18b. When an alarm is triggered, and the system 10 is entering an entry delay window, the control device 16 may iterate through the connected secondary controller 17 to send a pending alarm registration or alarm event signal. The secondary controller 17 may then receive the alarm registration or event signal and begin the expiration countdown. The secondary controller 17 may establish connection to the remote monitoring center 20 via the cellular connection in cell Network 18a. If the countdown expires, the secondary controller 17 may immediately report the pending alarm to the remote monitoring center 20.

Figure 10:
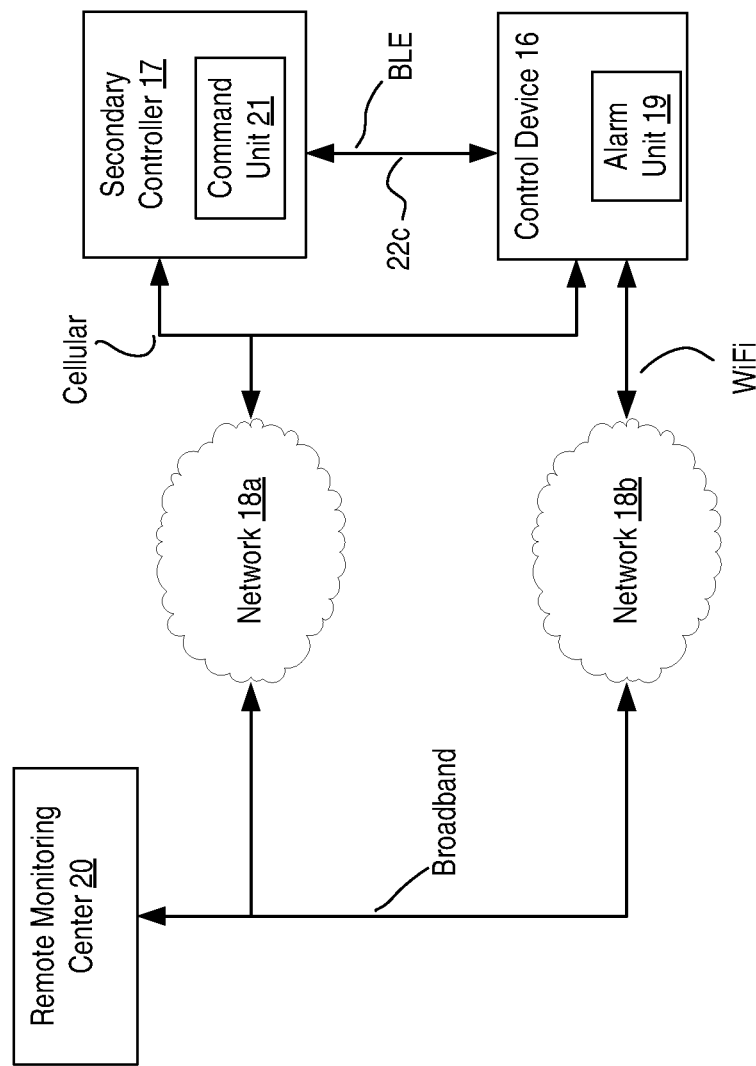
FIG. 10 is another example premises security system configuration according to some embodiments of the present disclosure.

Referring now to FIG. 10, in one or more embodiments, the control device 16 may include a Bluetooth® modem and a Wi-FI modem, and the secondary controller 17 may include a Bluetooth®/BLE modem, a backup battery, and active cellular modem. In these embodiments, the communication between the control device 16 and the secondary controller 17 may be encrypted using a proprietary protocol. As shown in FIG. 10, control device 16 and secondary controller 17 are in communication via the first communication link 22c that utilizes Bluetooth®/BLE connection. Additionally, the remote monitoring center 20 is in communication with the secondary controller 17 via the cellular connection in cell Network 18a, and the remote monitoring center 20 is in communication with the control device 16 via the broadband connection in broadband Network 18b. When an alarm is triggered, and the system 10 is entering an entry delay window, the control device 16 may iterate through the connected secondary controller 17 to send a pending alarm registration or alarm event signal. The secondary controller 17 may then receive the alarm registration or event signal and begin the expiration countdown. The secondary controller 17 may establish connection to the remote monitoring center 20 via the cellular connection in cell Network 18a. If the countdown expires, the secondary controller 17 may immediately report the pending alarm to the remote monitoring center 20.

Some Examples

Example A1. An on-site secondary controller 17 in communication with a control device 16 in a premises security system 11, the on-site secondary controller 17 comprising:
processing circuitry 46 configured to:
receive an alarm event signal;
temporarily store the alarm event signal; and
determine whether to transmit the stored alarm event signal to an off-site third controller 20 based on whether a criteria is met.

Example A2. The on-site secondary controller 17 of Example A1, wherein the criteria includes at least one of:
a connection between the secondary controller 17 and the control device 16 is at least temporarily disrupted;
a predetermined interval of time has expired;
an adverse event affecting the on-site secondary controller 17 is detected; and
an alarm trigger signal is received.

Example A3. The on-site secondary controller 17 of any of Examples A1 and A2, wherein the processing circuitry is further configured to transmit the alarm event signal to the off-site third controller 20 when it is determined that the criteria is met.

Example A4. The on-site secondary controller 17 of any of Examples A1-A3, wherein the alarm event signal includes at least one of audible, visual, and tactile information from a premises device in communication with the control device 16.

Example A5. The on-site secondary controller 17 of any of Examples A1-A4, wherein the on-site secondary controller 17 is a controller integrated with the premises security system 11.

Example B1. A control device 16 for a premises security system 11, the control device 16 comprising:
processing circuitry 34 configured to:
receive an event signal; and
transmit an alarm event signal to an on-site secondary controller 17 for temporary storage until a criteria is met for the on-site secondary controller 17 to perform at least one action associated with the criteria.

Example B2. The control device 16 of Example B1, wherein at least one of the event signal and the alarm event signal includes at least one of audible, visual, and tactile information from a premises device in communication with the control device 16.

Example B3. The control device 16 of Example B2, wherein the processing circuitry is further configured to:
receive a first alarm event termination signal; and
when the alarm event termination signal is received, transmit a second alarm event termination signal to the on-site secondary controller 17 to cause the on-site secondary controller 17 to discard the alarm event signal.

Example B4. The control device 16 of any of Examples B1-B3, wherein:
the event signal includes sensor data received from a premises device; and
the processing circuitry 34 is further configured to determine whether to trigger the alarm event signal based on the sensor data.

Example C1. A method implemented by an on-site secondary controller 17 in communication with a control device 16 in a premises security system 11, the method comprising:
receiving an alarm event signal from the control device 16;
temporarily store the alarm event signal; and determining whether to transmit the stored alarm event signal to an off-site third controller based on whether a criteria is met.

Example C2. The method of Example C1, wherein the criteria includes at least one of:
a connection between the secondary controller 17 and the control device 16 is at least temporarily disrupted;
a predetermined interval of time has expired;
an adverse event affecting the on-site secondary controller 17 is detected; and
an alarm trigger signal is received.

Example C3. The method of any of Examples C1 and C2, further including:
transmitting the alarm event signal to the off-site third controller 20 when it is determined that the criteria has been met.

Example C4. The method of any of Examples C1-C3, wherein the alarm event signal includes at least one of audible, visual, and tactile information from a premises device in communication with the control device 16.

Example C5. The method of any of Examples C1-C4, wherein the on-site secondary controller 17 is a controller integrated with the premises security system 11.

Example D1. A method implemented by a control device 16 for a premises security system 11, the method comprising:
receiving an event signal;
transmitting an alarm event signal to an on-site secondary controller 17 for temporary storage until a criteria is met for the on-site secondary controller 17 to perform at least one action associated with the criteria.

Example D2. The method of Example D1, wherein at least one of the event signal and the alarm event signal includes at least one of audible, visual, and tactile information from a premises device in communication with the control device 16.

Example D3. The method of any of Examples D1 and D2, further comprising:
receiving a first alarm event termination signal; and
transmitting a second alarm event termination signal to the on-site secondary controller 17 to discard the alarm event signal when the first alarm event termination signal is received.

Example D4. The method of any of Examples D1-D3, wherein:
the event signal includes sensor data received from a premises device; and
determining whether to trigger the alarm event signal based on the sensor data.

The concepts described herein may be embodied as methods, data processing systems, computer program products and/or computer storage media storing executable computer programs. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. Each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object-oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the present embodiments are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed:

1. An on-site secondary control device configured to communicate with an on-site primary control device of a premises security system, the on-site primary control device being configured to trigger an alarm event signal associated with the premises security system, the on-site secondary control device being physically separated from the on-site primary control device, the on-site secondary control device comprising:
   processing circuitry configured to:
     receive an alarm event signal from the on-site primary control device, the alarm event signal indicating that a premises device has been triggered;
     temporarily store the alarm event signal;
     determine that a criterion associated with the premises security system is met, the criterion comprising at least one of:
       a signal strength of a connection between the on-site secondary control device and the on-site primary control device being below a first threshold value;
       a signal to interference and noise ratio of the connection between the on-site secondary control device and the on-site primary control device being below a second threshold value;
       a power level of the on-site primary control device or the on-site secondary control device being below a third threshold value; or
       an accelerometer of one of the on-site primary control device or the on-site secondary control device detecting an acceleration greater than a fourth threshold value; and
     in response to determining that the criterion associated with the premises security system is met, transmit the alarm event signal to a remote monitoring center.

2. The on-site secondary control device of claim 1, wherein the criterion comprises at least one of:
   a wireless connection between the on-site secondary control device and the on-site primary control device is determined to be at least temporarily disrupted;
   a predetermined interval of time has expired;
   one of a mechanical failure or an electrical failure at one of the on-site secondary control device or the on-site primary control device is detected; or
   an alarm trigger signal including a predefined code entered by a user is received.

3. The on-site secondary control device of claim 1, wherein the alarm event signal comprises at least one of:
   information associated with a type of alarm event;
   a required attribute to disarm the premises security system; or
   information indicating a predetermined interval of time to disarm the premises security system.

4. The on-site secondary control device of claim 1, wherein:
   the on-site secondary control device is configured to communicate with the remote monitoring center via a first communication protocol; and
   the on-site secondary control device is configured to communicate with the on-site primary control device via a second communication protocol, the first communication protocol being different from the second communication protocol.

5. A premises security system, comprising:
   a premises device located at a premises;
   an on-site primary control device located at the premises and configured to communicate with the premises device and an on-site secondary control device located at the premise, the on-site secondary control device being physically separated from the on-site primary control device, the on-site primary control device comprising on-site primary control device processing circuitry configured to:
     receive a detection signal from the premises device;
     determine that an alarm event has occurred based on the detection signal;
     transmit an alarm event signal to the on-site secondary control device for temporary storage; and
     trigger a predefined timer, an expiration of the predefined timer configured to cause transmission of the alarm event signal to a remote monitoring center; and
   wherein the on-site secondary control device comprises on-site secondary control device processing circuitry configured to:
     receive the alarm event signal from the on-site primary control device;
     temporarily store the alarm event signal;
     determine that a criterion associated with the premises security system is met, the criterion comprising at least one of:
       a signal strength of a connection between the on-site secondary control device and the on-site primary control device being below a first threshold value;
       a signal to interference and noise ratio of the connection between the on- site secondary control device and the on-site primary control device being below a second threshold value;
       a power level of the on-site primary control device or the on-site secondary control device being below a third threshold value; or
       an accelerometer of one of the on-site primary control device or the on-site secondary control device detecting an acceleration greater than a fourth threshold value; and
     in response to determining that the criterion associated with the premises security system is met, transmit the alarm event signal to a remote monitoring center.

6. The premises security system of claim 5, wherein the criterion includes at least one of:
   a wireless connection between the on-site secondary control device and the on-site primary control device is determined to be at least temporarily disrupted;
   a predetermined interval of time has expired;
   one of a mechanical failure or an electrical failure at one of the on-site secondary control device or the on-site primary control device is detected; or
   an alarm trigger signal including a predefined code entered by a user is received.

7. The premises security system of claim 5, wherein the alarm event signal comprises at least one of:
   information associated with a type of alarm event;

a required attribute to disarm the premises security system; or information indicating a predetermined interval of time to disarm the premises security system.

8. The premises security system of claim 5, wherein:

the on-site secondary control device is configured to communicate with the remote monitoring center via a first communication protocol; and the on-site secondary control device is configured to communicate with the on-site primary control device via a second communication protocol, the first communication protocol being different from the second communication protocol.

9. A method implemented by an on-site secondary control device in communication with an on-site primary control device for a premises security system, the on-site primary control device being configured to trigger an alarm event signal associated with the premises security system, the on-site secondary control device being physically separated from the on-site primary control device, the method comprising:

receiving an alarm event signal from the on-site primary control device, the alarm event signal indicating that a premises device has been triggered;

temporarily storing the alarm event signal;

determining that a criterion associated with the premises security system is met, the criterion comprising at least one of:

a signal strength of a connection between the on-site secondary control device and the on-site primary control device being below a first threshold value;

a signal to interference and noise ratio of the connection between the on-site secondary control device and the on-site primary control device being below a second threshold value;

a power level of the on-site primary control device or the on-site secondary control device being below a third threshold value; or an accelerometer of one of the on-site primary control device or the on-site secondary control device detecting an acceleration greater than a fourth threshold value; and in response to determining that the criterion associated with the premises security system is met, transmitting the alarm event signal to a remote monitoring center.

10. The method of claim 9, wherein the criterion comprises at least one of:

a wireless connection between the on-site secondary control device and the on-site primary control device is determined to be at least temporarily disrupted;

a predetermined interval of time has expired;

one of a mechanical failure or an electrical failure at one of the on-site secondary control device or the on-site primary control device is detected; or an alarm trigger signal including a predefined code entered by a user is received.

11. The method of claim 9, wherein the alarm event signal comprises at least one of:

information associated with a type of alarm event;

a required attribute to disarm the premises security system; or information indicating a predetermined interval of time to disarm the premises security system.

* * * * *